United States Patent
Koechner et al.

[15] 3,702,974
[45] Nov. 14, 1972

[54] REDUCTION OF THERMALLY INDUCED STRESS BIREFRINGENCE IN A SYNTHETIC CRYSTAL BY CONTROL OF GROWTH DIRECTION

[72] Inventors: Walter Koechner, Malibu; Dennis Keith Rice, West Los Angeles; Larry Grant DeShazer, Los Angeles, all of Calif.

[73] Assignee: Union Carbide Corporation

[22] Filed: Oct. 26, 1970

[21] Appl. No.: 83,983

[52] U.S. Cl............331/94.5 T, 23/301 SP, 23/305, 331/94.5 F
[51] Int. Cl..................................................H01s 3/00
[58] Field of Search...........331/94.5; 23/301 SP, 305

[56] References Cited

UNITED STATES PATENTS

3,130,254   4/1964   Sorokin et al. ............331/94.5
3,252,103   5/1966   Geusie et al. .........331/94.5 X

OTHER PUBLICATIONS

Lefever et al., Jour. of Applied Physics, vol. 32, pp. 962–963, May, 1961
Foster et al., Jour. of Applied Physics, vol. 41, pp. 3,656–3,663, August, 1970
Nassau et al., Jour. of Applied Physics, vol. 33, pp. 3,064–3,073, Oct., 1962
Curtis et al., Brit. Jour. of Applied Physics, vol. 16, pp. 734–736, May, 1965

*Primary Examiner*—Ronald L. Wibert
*Assistant Examiner*—Edward S. Bauer
*Attorney*—Pastoriza & Kelly

[57] ABSTRACT

Thermally induced stress birefringence in a synthetic laser rod crystal can be minimized in certain portions of the crystal by growing the crystal in a specified direction. This direction is the [001] or equivalent direction as contrasted to the conventional [111] growth direction. Utilizing such a crystal in a laser system having a polarizing means in the optical cavity enables power losses in the polarized laser light to be minimized by orienting the direction of polarization to intercept those portions of the crystal exhibiting minimum birefringence.

5 Claims, 9 Drawing Figures

*INVENTORS:*
WALTER KOECHNER
DENNIS KIETH RICE
LARRY GRANT DESHAZER
BY *Pastoriza & Kelly*
*ATTORNEYS*

3,702,974

REDUCTION OF THERMALLY INDUCED STRESS BIREFRINGENCE IN A SYNTHETIC CRYSTAL BY CONTROL OF GROWTH DIRECTION

This invention relates generally to synthetic crystals and more particularly to the control of growth direction in a synthetic laser rod crystal for use as a host medium in a laser system in a manner to minimize the effects of thermally induced stress birefringence.

BACKGROUND OF THE INVENTION

Birefringence or double refraction, that is, the splitting of incident light into two components which travel at different velocities, is normally induced as a consequence of thermal stresses in many types of laser crystals. Such thermally induced birefringence in yttrium aluminum garnet host crystals doped with neodymium ions (YAG:Nd) results in a significant reduction in the output when a linear polarizer is introduced into the optical cavity. Polarization is required in pulsed lasers utilizing, for example, electro-optical Q-switching or second harmonic generation. If the losses due to birefringence could be substantially reduced or possibly eliminated, the output powers achievable in both continuous wave (cw) and pulsed type operations of the laser would be greatly increased. Further, electro-optic Q-switching techniques would become practical for cw YAG:Nd lasers.

Heretofore, various techniques have been proposed to minimize or compensate the birefringence inherent in laser crystals. For example, some of these techniques have involved the insertion of various types of components into the optical or resonator cavity to rotate the plane of polarization or to mechanically apply equal and opposite stresses. Other approaches have attempted to compensate by introducing equal and opposite thermal stresses into the crystal rod itself. However, such approaches generally result in additional losses in the optical cavity, complicated designs, and other problems associated with the addition of components into the laser system.

BRIEF DESCRIPTION OF THE PRESENT INVENTION

In accord with the present invention, thermally induced stress birefringence in a synthetic laser rod crystal is reduced by control of the growth direction of the crystal.

More particularly, we have discovered that by growing the crystal in a specified direction portions of the crystal will exhibit minimum thermally induced stress birefringence. By then utilizing such a crystal in the laser system and arranging the relative orientation of the crystal with respect to a polarizing means in the optical cavity, the direction of polarization can be made to intercept those portions of the crystal exhibiting such minimum birefringence, thereby minimizing power losses.

In the preferred embodiment of the invention, the synthetic crystal involved is a yttrium aluminum garnet crystal doped with neodymium ions and the specified direction for providing portions exhibiting minimum thermally induced stress birefringence is the [001] direction or equivalent such that one of the crystallographic axes of the rod is parallel to the lasing axis of the rod. This direction is different from the conventional [111] direction of crystal growth.

BRIEF DESCRIPTION OF THE DRAWINGS

A better understanding of the invention will be had by now referring to the accompanying drawing, in which.

DETAILED DESCRIPTION OF THE INVENTION

Figure 1:
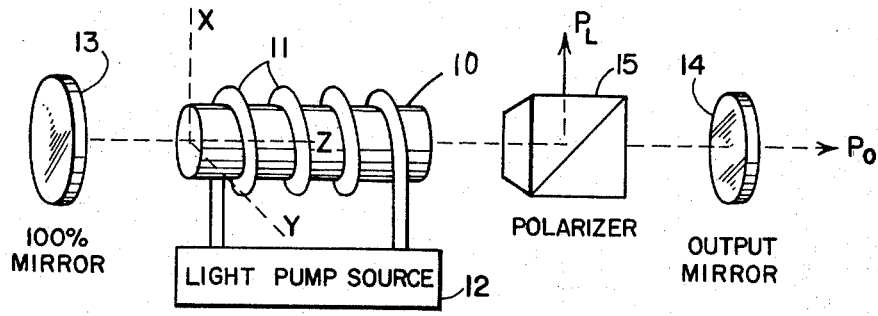
FIG. 1 illustrates a laser system including a crystal grown in a specified direction in accord with the present invention as the laser medium.

Referring first to FIG. 1 there is shown a cylindrical laser rod 10 and cooperating light pump means in the form of a helical lamp 11 powered from a light pump source 12. Other light pumping configurations could be used, the showing in FIG. 1 being diagrammatic. Suitable end mirrors 13 and 14 define an optical cavity or resonator for the laser medium 10. The mirror 13 is 100 percent reflecting and the mirror 14 is partially reflecting and partially transmissive in order to couple out the laser light.

Disposed within the optical cavity of the system of FIG. 1 is a polarizer 15. When the laser system of FIG. 1 is operated, there will be certain power losses in the polarized laser light indicated by the symbol $P_L$. The coupled out laser light is indicated by the symbol $P_o$. Thermally induced stress birefringence in the crystal 10 can result in significant power losses in the polarized beam in the system of FIG. 1. To minimize such losses, the birefringence itself is minimized in accord with the present invention by growing the crystal 10 in a specified direction.

In the particular example chosen to illustrate the present invention, the crystal 10 constitutes a yttrium aluminum garnet crystal doped with neodymium ions. This crystal has a cubic symmetry of space group $O_h$ (Schoenflies symbol).

Figure 2:
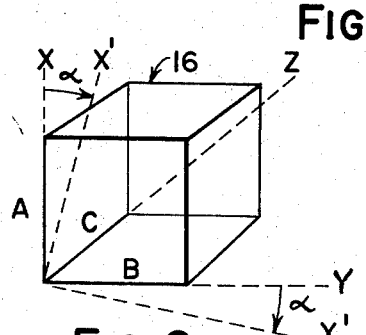
FIG. 2 shows the relative orientation of a Cartesian coordinate system to the sides of a cubic crystal when the system is rotated about the Z axis.
Figure 3:
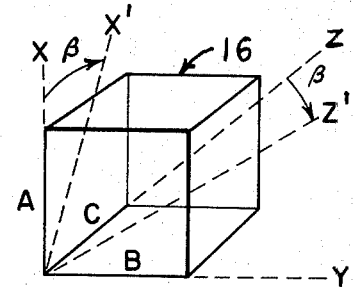
FIG. 3 is a view similar to FIG. 2 showing the relative orientation of the coordinate system when rotated about the Y axis.

FIGS. 2 and 3 schematically illustrate at 16 a cubic crystal corresponding to the YAG:Nd laser of FIG. 1. In order to specify directions in the cubic crystal there is illustrated a Cartesian coordinate system X, Y, and Z coincident with the sides A, B, and C of the cubic crystal. Two angles, α and β are used to designate rotations of the Cartesian coordinate system to a new coordinate system about the Z axis as illustrated in FIG. 2, and the Y axis as illustrated in FIG. 3. The new coordinate directions are designated by X' and Y' for FIG. 2 and X' and Z' for FIG. 3. A specified direction in the cubic crystal may thus be designated by the magnitude of the angles α and β. It will be noted in FIG. 2 that the side C of the cubic crystal is coincident with the Z axis which axis in turn defines the axis of the cylindrical crystal rod.

Figure 4:
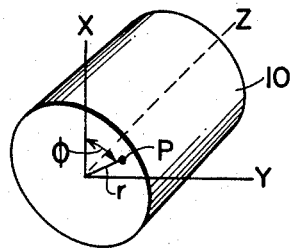
FIG. 4 is a perspective view of the crystal rod constituting the laser medium of FIG. 1 with a polar coordinate system for locating any specified point in the crystal.

FIG. 4 illustrates the crystal rod 10 with its cylindrical axis coincident with the Z axis and the coordinate axes X and Y in a plane transverse or normal to the Z axis. By utilizing polar coordinates φ and r and point P can be designated in the transverse plane of the crystal.

Figure 5:
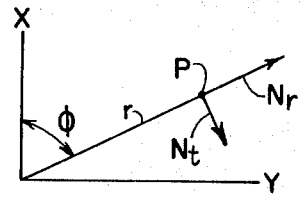
FIG. 5 illustrates the coordinate system of FIG. 4 useful in explaining birefringence.

With particular reference to FIG. 5, the birefringence of the crystal at any point P is determined by the difference in the index of refraction of light in a direction coincident with the r coordinate, $N_r$ and the index of refraction at right angles or a tangential direction $N_t$. When this difference is minimized, the thermally induced stress birefringence is minimal.

Figure 6:
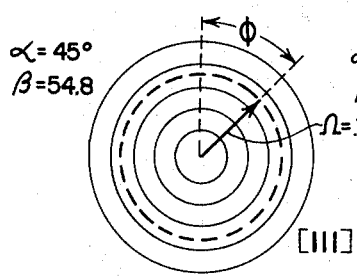
FIG. 6 is a polar plot indicating the magnitude of birefringence in a laser crystal grown in the conventional [111] direction.

Referring now to FIG. 6, there is illustrated a polar coordinate plot wherein the dashed circle approximately three-fourths of the way out from the center of the plot represent the magnitude of birefringence. This magnitude is designated by the symbol Ω. It will be noted that the birefringence is substantially equal at all points equally spaced from the center of the crystal in the transverse plane. Thus, the birefringence is independent of the angle φ.

The relative birefringence illustrated in FIG. 6 is typical of a YAG:Nd crystal grow in the conventional manner and that is, along the [111] direction. With reference to FIGS. 2 and 3, this direction would be a long diagonal of the cube extending from the origin of the coordinate system to the far upper right hand vertex of the cube. Such direction is properly designated when the angle α is 45° and the angle β 54.8°.

Figure 7:
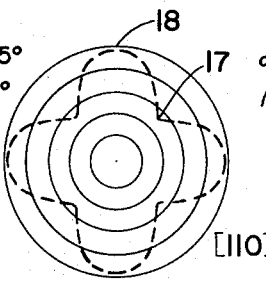
FIG. 7 is a plot similar to FIG. 6 of a crystal grown in the [110] direction.

FIG. 7 illustrates the birefringence characteristics in certain portions of the crystal when grown in a different direction from that shown in FIG. 6; more specifically, in the [110] direction. This direction is specified when the angle α is 45° and the angle β 0°. It will be noted that there are four points such as indicated at 17 at which the birefringence has a minimum magnitude and four other points such as indicated at 18, at which the birefringence is maximum. Generally, the magnitude Ω is a function of the angle φ, the coordinate r, and the angles α and β. Thus, by growing the crystal in the [110] direction as illustrated in FIG. 7, portions of the crystal such as corresponding to the point 17 can be made to exhibit decreased birefringence over the birefringence in the conventionally grown crystal of FIG. 6.

Figure 8:
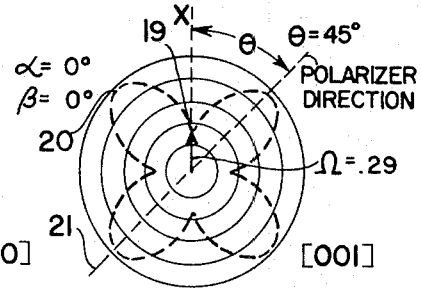
FIG. 8 is a polar plot similar to FIG. 7 but illustrating the magnitude of birefringence in various portions of the crystal when grown in a specified direction corresponding to the [001] direction or equivalent; and, FIG. 9 is a qualitative graph useful in illustrating the relative improvement in transmission efficiency or power characteristics realizable when utilizing the present invention as opposed to conventionally grown crystals in a laser system.

FIG. 8 shows the result in magnitude of the birefringence at various points in the transverse plane of the crystal when the crystal itself is grown in the [001] direction or equivalent. The pattern illustrated in FIG. 8 shows a minimum birefringence at the point 19 which occurs at four symmetrically spaced points in the transverse crystal plane. The magnitude Ω at this point is 0.29 as opposed to 0.74 for a crystal grown in the conventional direction as illustrated in FIG. 6. Maximum birefringence however occurs at four other symmetrically spaced points, as indicated at 20, which birefringence is considerably greater than the birefringence illustrated in FIG. 6. However, by orienting the direction of polarization of the laser light in the embodiment of FIG. 1 to intercept the portions of the crystal exhibiting minimum birefringence, the overall effect is to reduce substantially the power losses in the polarized laser light.

In FIG. 8, the direction of polarization is indicated by the dashed line at 21. The relative orientation between this direction and the crystal is measured by the angle θ from the vertical X axis. In FIG. 8, the polarization direction is shown as intercepting the points exhibiting maximum birefringence. In actually utilizing the crystal in the system of FIG. 1, the direction of polarization would be oriented to intercept the minimum points wherein the angle θ would be 0° or 90°.

Figure 9:
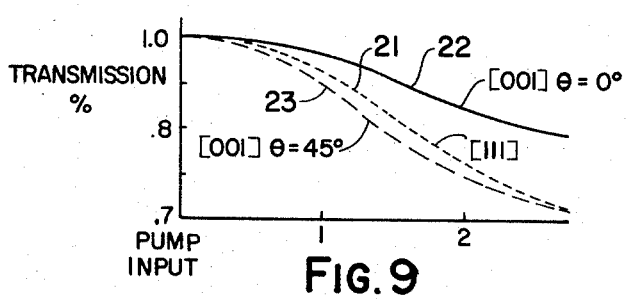

Referring now to FIG. 9, the reduced power losses or increased transmission efficiency is graphically illustrated over a range of pump input power. The dashed line 21 in FIG. 9 illustrates the transmission characteristics utilizing a crystal grown in the [111] direction such as described in conjunction with FIG. 6. This characteristic is typical of prior art crystals.

The solid line, 22, represents a vast improvement in power transmission of the polarized laser light when a crystal grown in the [001] direction is used in the laser system and the direction of polarization is aligned to intercept the minimum birefringence points; that is, the angle θ as shown in FIG. 8 is 0. It will be noted that there is less power loss over the shown range of pump input power.

The dashed line, 23, shows the greatly increased power loss when the direction of polarization is oriented to intercept the point of maximum birefringence in the crystal of FIG. 8; that is, where θ equals 45°. It is thus important that in taking advantage of the minimal birefringence points, proper relative orientation between the direction of polarization and the crystal rod itself be maintained.

The pattern obtained in FIG. 8 produces points of minimum birefringence which points exhibit less birefringence than in the case where the crystal is grown in any other directions. However, it should be understood that there are directions equivalent to the [001] direction wherein the identical pattern of FIG. 8 is obtained, although it may be rotated. Equivalent directions exist because of the cubic symmetry of the crystal. For example, in FIG. 8 the pattern shown results when α equals 0°. However, the same pattern will result for α equal to any angle with β still equal to 0°. The only difference is that the pattern is rotated in the plane of FIG. 8. Also, the same pattern results, although it may be rotated to a different position for β equal to 90°, and α equal to either 0° or 90°. For any other combination of angles of α and β, there will not result a minimum birefringence as small as that exhibited in FIG. 8.

In view of the foregoing, it should be understood that the terminology of the specified direction as [001] or equivalent would include the [001] direction, the [100] direction, and the [010] direction. In these directions, one of the mutually orthogonal crystallographic axes is parallel to the lasing axis of the rod. For the [100] direction, $\alpha$ equals 0° and $\beta$ equals 90°, whereas for the [010] direction, $\alpha = 90°$ and $\beta = 90°$.

From the foregoing description, it will thus be seen that the present invention has provided a vastly improved laser crystal, particularly useful in laser systems incorporating a polarizer in the optical cavity, wherein by proper control of growth in a specified direction, minimum birefringence is realizable all to the end that power losses are minimized.

What is claimed is:

1. A method of reducing thermally induced stress birefringence in portions of a synthetic laser rod crystal having cubic symmetry comprising the step of growing the crystal in the [001] direction or equivalent such that one of the crystallographic axes of the rod is parallel to the lasing action of the rod.

2. The method of claim 1, in which said crystal is yttrium aluminum garnet doped with neodymium ions and formed into a cylindrical rod for use as a laser medium in a laser system having a polarizing means in the optical cavity, said method including the step of fixing the relative orientation of said rod and polarizing means such that the direction of polarization intercepts at least some of those portions of the crystal exhibiting minimum birefringence, whereby power losses in the polarized laser light are minimized.

3. A synthetic laser rod crystal having cubic symmetry grown in the [001] direction or equivalent such that one of the crystallographic axes of the rod is parallel to the lasing axis of the rod to minimize thermally induced stress birefringence in portions of the crystal.

4. The subject matter of claim 3, in which said crystal comprises yttrium aluminum garnet doped with neodymium ions and formed into a cylindrical rod for use as a laser medium in a laser system.

5. In a laser system including a laser rod, light pumping means, first and second end mirrors defining an optical cavity, and a polarizing means in said cavity, the improvement comprising the combination of a yttrium aluminum garnet host crystal doped with neodymium ions for said laser rod grown in the [001] direction or equivalent such that one of the crystallographic axes of the rod is parallel to the lasing axis of the rod and a means relatively orienting said crystal and direction of polarization of said polarizing means such that those portions of said crystal intercepted by polarized light exhibit minimum thermally induced birefringence as a consequence of crystal growth in said [001] or equivalent direction.

* * * * *

UNITED STATES PATENT OFFICE
CERTIFICATE OF CORRECTION

Patent No. 3,702,974                Dated November 14, 1972

Inventor(s) Walter Koechner, Dennis Keith Rice & Larry Grant De Shazer

It is certified that error appears in the above-identified patent and that said Letters Patent are hereby corrected as shown below:

Column 5, line 17

Change "action" to --axis--.

Signed and sealed this 10th day of April 1973.

(SEAL)
Attest:

EDWARD M. FLETCHER, JR.　　　　　　　　　ROBERT GOTTSCHALK
Attesting Officer　　　　　　　　　　　　Commissioner of Patents